June 7, 1938.   G. C. WORRELL   2,119,568
MACHINE TOOL
Original Filed Jan. 12, 1937   3 Sheets-Sheet 2
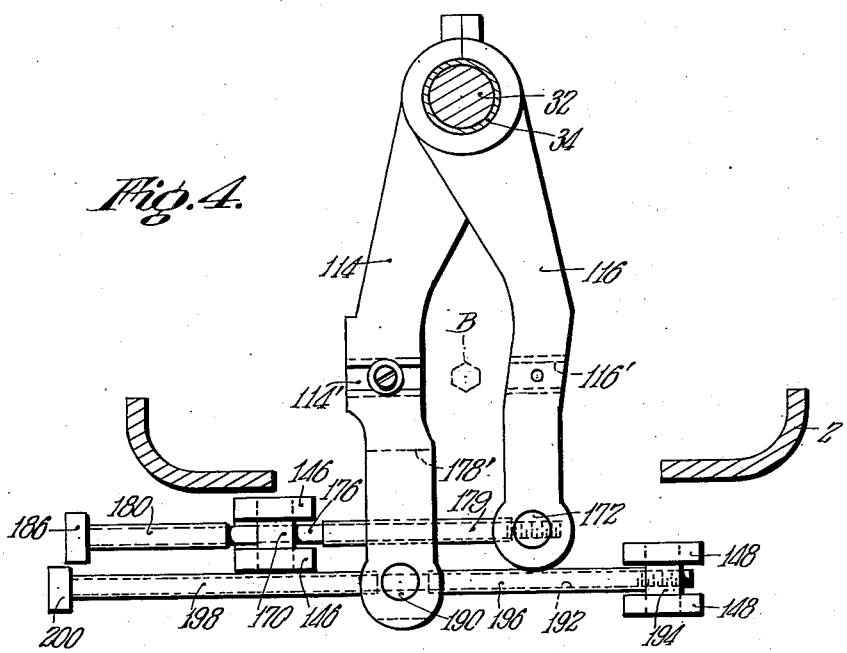
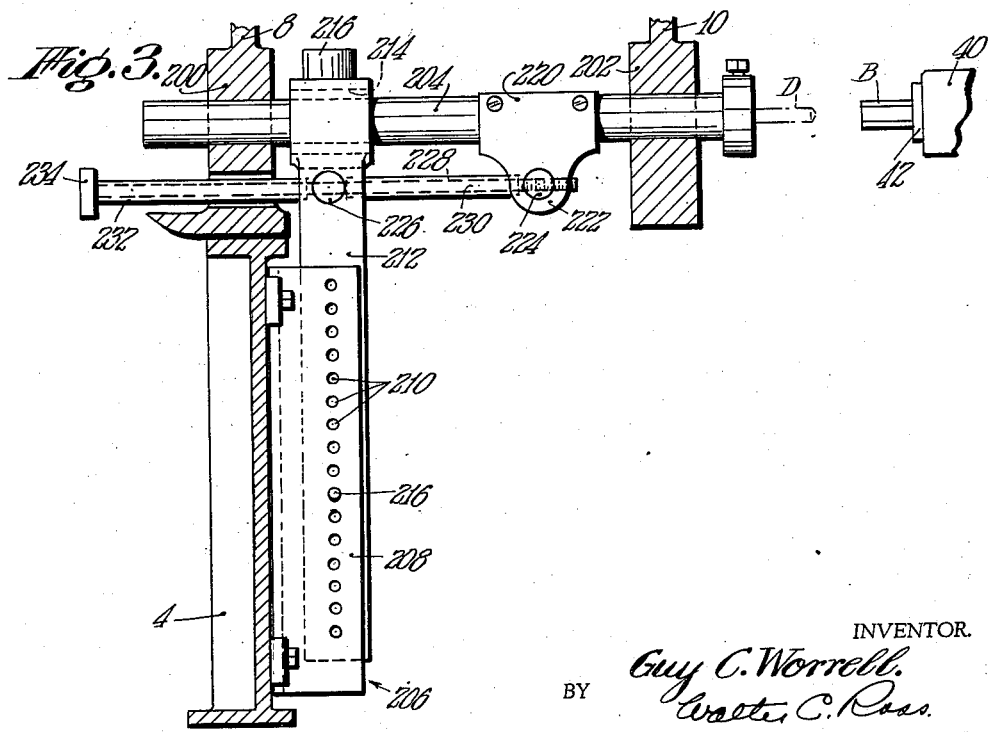
INVENTOR.
Guy C. Worrell.
BY Walter C. Ross.
ATTORNEY.

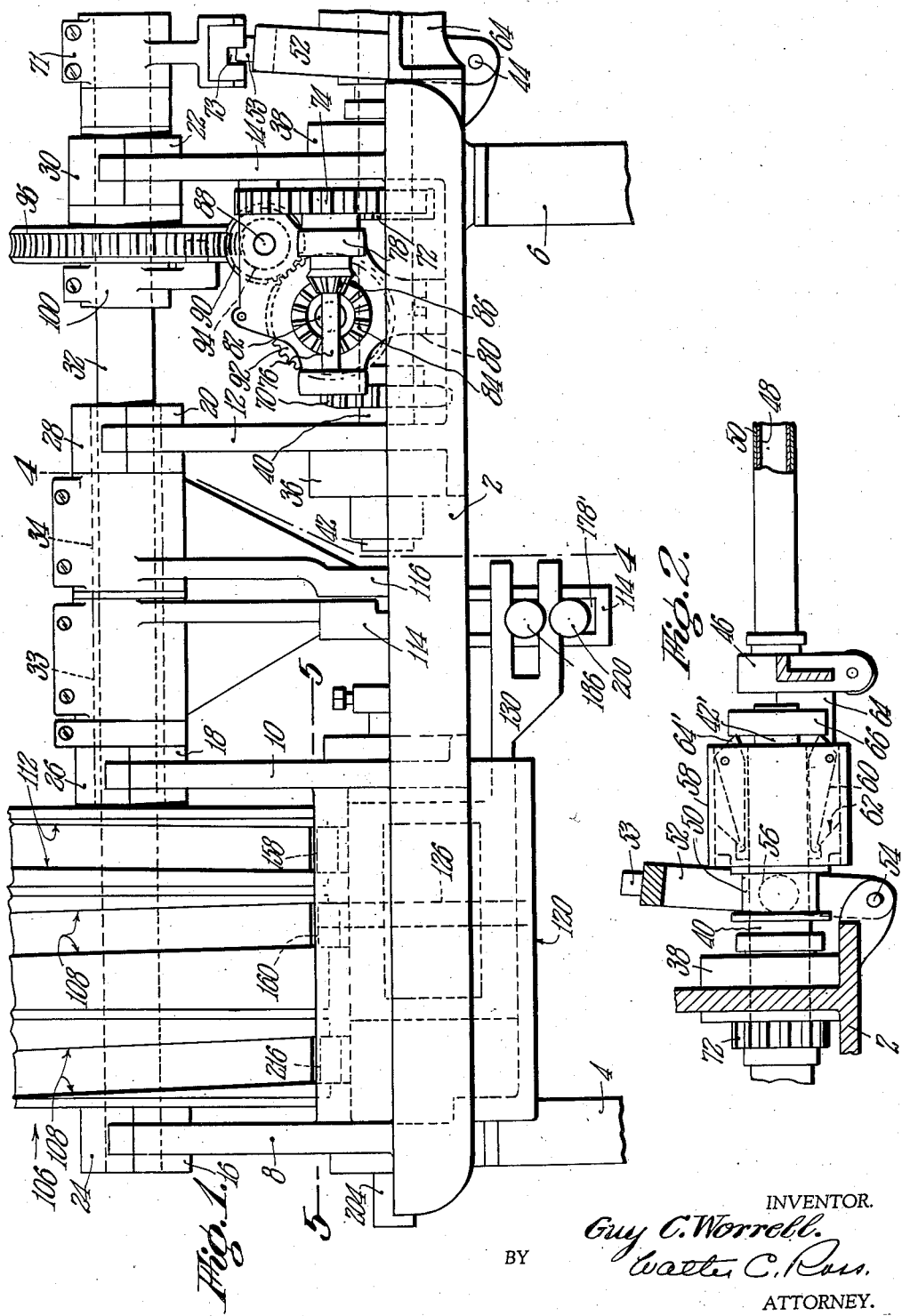

June 7, 1938.  G. C. WORRELL  2,119,568
MACHINE TOOL
Original Filed Jan. 12, 1937  3 Sheets-Sheet 3

INVENTOR.
Guy C. Worrell.
BY Walter C. Ross.
ATTORNEY.

Patented June 7, 1938

2,119,568

UNITED STATES PATENT OFFICE 2,119,568

MACHINE TOOL

Guy C. Worrell, Westfield, Mass., assignor to Charles F. Ely, Westfield, Mass., as trustee Application January 12, 1937, Serial No. 120,213
Renewed October 1, 1937

11 Claims. (Cl. 29—53)

This invention relates to improvements in machine tools and is directed more particularly to machines for forming objects from bar stock.

The principal objects are directed to the provision of a machine for forming objects from bar stock which is simple in construction and efficient in operation, to facilitate the producing of accurately formed objects economically.

While in the present preferred form of the invention the described machine is adapted for cutting off and forming nut blanks from bar stock, the invention is not to be so limited.

According to one feature of the invention a plurality of movable tool carriers are provided which are moved back and forth by actuators and the actuators are operated by suitable operating means in such a way that the connections between the actuators and support therefor may be shifted to effect movements of the tool carriers through different distances without the necessity of changing the operating mechanism. In other words the operating mechanism moves the actuators back and forth a certain distance but, according to the location of the connection between the actuators and their connection with the support, the tool carriers may be moved through different distances and in that way it is not necessary to change cams when it is desired to change the length of travel of the tool carriers.

According to another feature of the invention the tube which supports and in which the bar stock is rotated is insulated to absorb and deaden the noise which is always present in machines where a bar of stock is fed to the machine through a supporting tube.

Various other novel features and advantages of the invention will be hereinafter more fully referred to in connection with the accompanying description of the preferred form of the invention, reference being made to the accompanying drawings wherein:

Fig. 1 is a side elevational view of a machine embodying the novel features of the invention;

Fig. 2 is a partial longitudinal sectional elevational view taken at the right-hand end of the machine shown in Fig. 1;

Fig. 3 is a partial longitudinal sectional elevational view through the machine shown in Fig. 1 at the left-hand end thereof;

Fig. 4 is a transverse elevational sectional view on the line 4—4 of Fig. 1;

Figure 5:
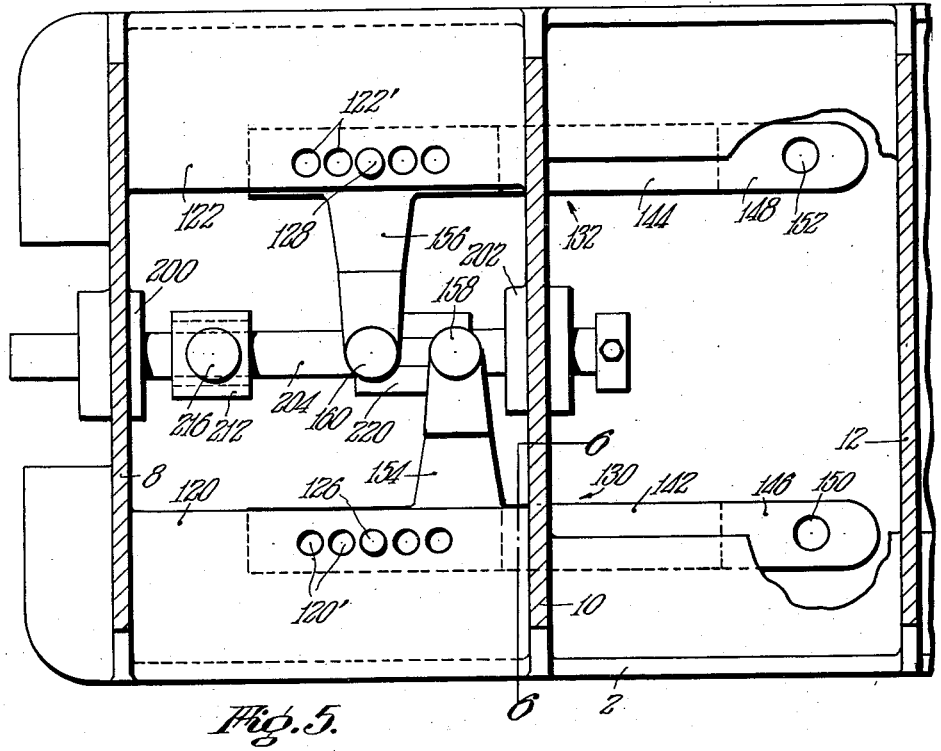
Fig. 5 is a sectional plan view on the line 5—5 of Fig. 1 with parts omitted for clearness.

Referring now to the drawings more in detail the invention will be fully described.

A bed 2 is provided which is supported at opposite ends by supports 4 and 6. The supports and bed are suitably secured together to provide a rigid and strong supporting structure.

The bed has upwardly extending therefrom transverse webs 8, 10, 12 and 14. Bearings 16, 18, 20 and 22 associated with the webs are provided with caps 24, 26, 28 and 30. A shaft 32 is journalled in the bearings 16 and 22 and a tube 34 surrounding the shaft 32 is journalled in the bearings 18 and 20.

The webs 12 and 14 have bearings 36 and 38 in which is journalled a hollow spindle 40 carrying a collet 42. A bracket 64 at the right-hand end of the machine supports a hub 46 from which extends a tube 48. This tube 48 is adapted to receive a bar of stock which passes into and through the spindle 40.

The tube 48 is covered with some more or less resilient material such as rubber, rubber composition, or the like, indicated at 50. The covering 50 is provided to eliminate noise as the bar stock in the tube 48 is rotated by the spindle 40.

A collet tube 42' (see Fig. 2) movable back and forth in the spindle 40 operates the collet which grips the bar stock in the spindle 40 to rotate the same and releases it to allow the stock to be fed forwardly within the spindle. A collar 50 is slidable back and forth on the spindle 40 and this is moved back and forth by a fork 52 which is pivoted at 54 to the bed 2. A roll or rolls 56 are carried by the fork 52 for engaging with the collar 50.

A barrel member 58 has levers 60 pivoted therein which are acted upon by a cam surface 62 of the collar 50 as the collar is moved to the right. The inner ends of lever 62 are depressed by the collar so that their outer ends 64' engage a collar 66 of collet tube 42' whereby the collet is caused to grip a bar of stock.

When the collar 52 is moved to the left the collet releases. By swinging the fork 52 back and forth the collet grips and feeds the bar of stock forwardly, the spindle being rotatable to rotate the bar, and releases the bar to move rearwardly and engage the bar for again feeding it forwardly.

The construction just described is common with machines of this general character and forms no part of the present invention.

A cam roll 53 on fork 52 is engaged by operating means now to be described.

The spindle 40 may function as the main driving shaft of the machine and to that end it carries a sprocket 70 which may be connected by a chain to motor or other driving means. A gear 72 on the spindle 40 meshes with a gear 74, of a shaft 76 which is rotatable in bearings 78 of a bracket 80 which is supported by and secured to the bed.

A transverse shaft or stud 82 is rotatable in bracket 80 and carries a bevel gear 84 which meshes with a bevel gear 86 on shaft 76. A transverse shaft or stud 88 journalled in bracket 80 has a gear 90 which meshes with a gear 92 on shaft 82 and a worm 94 on the shaft 88 meshes with a worm gear 96 on shaft 32.

The worm gear 96 may be adjustable on shaft 32 and operatively connected to the said shaft 32 by means of a member 100 which is non-rotatable on the shaft 32. By means of the mechanism described the shaft 32 is rotated from the spindle 40. A cam member 71 on shaft 32 has a cam slot 73 which, as shaft 32 rotates, engages roll 53 of fork 52 to rock said fork back and forth.

A cam drum 106 on shaft 32 has cam slots 108, 110 and 112. Tool carriers 114 and 116 are fixed to their respective tubes 33 and 34 and are arranged for independent and relative oscillatory movements, the said carriers being operated from the cams by actuators to be described.

The carriers 114 and 116 are provided with slots or some suitable tool-holding and supporting means such as indicated by 114' and 116' in Fig. 4. The carriers are arranged to swing back and forth so that the tools carried thereby operate on a bar of stock rotated by spindle 40, a bar being represented by C in Fig. 4. The carrier 33 may carry a cut-off tool to cut off a formed object from the bar while the carrier 34 may carry a forming tool to form an object such as a nut blank on the end of the bar.

Figure 6:
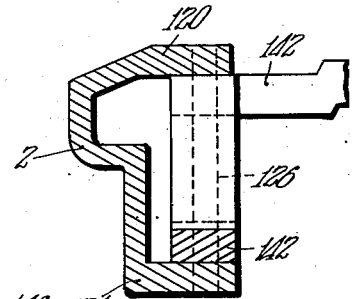
Fig. 6 is a transverse sectional elevational view on the line 6—6 of Fig. 5.

At the left-hand end of the machine as viewed in Fig. 1 the bed on its opposite sides has upper shelves 120 and 122 and lower shelves such as 124 (see Fig. 6). These shelves are spaced apart to receive actuators therebetween. Each shelf is provided with a plurality of openings such as 120' and 122' shown in the upper shelves 120 and 122 while the lower shelves are provided with openings in alignment therewith. These openings are adapted to receive pivot pins such as 126 and 128.

Figure 7:
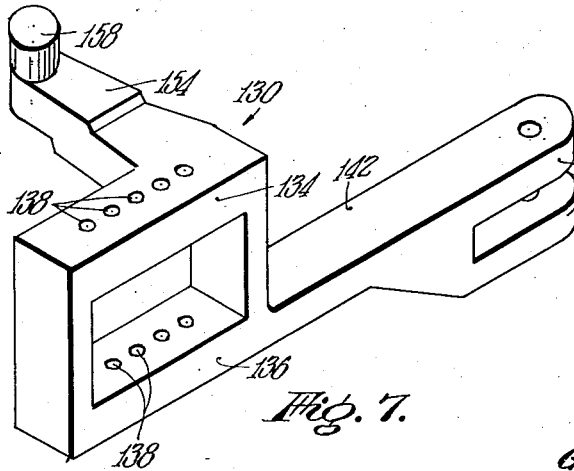
Fig. 7 is a perspective view of one of the tool carrier actuators of the machine shown in Fig. 1.

Actuators 130 and 132 for the tool carriers are similar in construction and the actuator 130 is shown more in detail in Fig. 7. As shown in Fig. 7 each actuator 130 has an upper cheek such as 134 and a lower cheek such as 136 which are spaced apart to removably fit between the upper and lower shelves of the bed.

The cheeks have openings such as 138 which are adapted to align with the openings of the upper and lower shelves. The pivot pins 126 and 128 are receivable in any certain aligned openings in the actuator and shelves so as to provide different pivotal points for the actuators.

The actuators 130 and 132 have end parts 142 and 144. Spaced lugs 146 are provided on the end part 142 of actuator 130 and similar lugs 148 are provided on actuator 132. The lugs are provided with openings 150 and 152.

Inwardly extending arms 154 and 156 of the actuators 130 and 132 carry rolls or projections 158 and 160 which are receivable and operate with the cam groove 108 and 112. The actuators 130 and 132 are connected to the tool carriers by the means now to be described with particular reference to Fig. 4.

A stud 170 is rotatable in the openings 150 of actuator 130 and a stud 172 is rotatable in the lower end of tool carrier 34. A rod 176 has its end in threaded engagement with the stud 172 of carrier 116, passes through a slot 178' of carrier 114 and is slidable in stud 170. Tubes 179 and 180 on the rod 176 are disposed between studs 170 and 172 and between the stud 170 and a manually engageable part 186 of the rod 176. As the actuator 130 moves back and forth the carrier 34 is moved back and forth thereby. By rotating the rod 176 in one direction or the other the relationship of the actuator and tool carrier may be varied.

A stud 190 in the lower part of tool carrier 133 slidably receives a rod 192 which has its end in threaded engagement with a stud 194 of actuator 132 and tubes 196 and 198 are disposed between studs 190 and 194 and between stud 190 and a manually engageable part 200 of rod 192. As with the actuator and tool carrier 34 the relationship of carrier 33 and actuator 132 may be varied.

As the cam drum rotates the cam grooves swing the actuators back and forth on their pivots the position of which may be varied. According to the throw or rise of the cam grooves the roll parts of the actuators in engagement with the cam grooves are moved back and forth a certain distance. By inserting the pivots in various openings than those shown the distance through which the ends of the actuators connected to the carriers is variable so that the travel of the carriers is variable.

Because the pivotal connections may be changed it is possible to easily and readily vary the throw of the tool carriers. Ordinarily it is necessary when it is desired to vary the throw of a tool carrier operated by a cam to vary the cam or to substitute one having a different rise or throw. Otherwise the parts are set so that the cam surface operates on the part operated thereby for a portion of its rotation, depending on the throw desired.

With a cam having a one inch throw, when it is desired to employ a half inch, then the part is in contact with the cam for approximately a half revolution. With the construction desired the cam operates throughout its cycle of operation and the variation of carrier travel is accomplished by varying the pivotal connections. The tubes and rods connecting the actuators and tool carriers make it possible to change the relationship thereof and set the tools as may be desired with reference to the bar being operated on.

Bearings 200 and 202 are carried by the webs 8 and 10 and in these there is reciprocable a tool carrier 204 (see Fig. 3). This carrier may support a tool such as a drill D which as the carrier is reciprocated forwardly operates on the bar B which is rotated by the spindle 40.

A bracket 206 has spaced side plates 208 which are provided with aligned openings 210. Between the plates 208 there is an actuator 212 which at its upper end is provided with an opening 214 through which the tool carrier 204 passes. A projection or cam roll 216 co-operates with the cam grooves 108.

A pivot 216 is provided for inserting in a certain one of a plurality of openings provided in part 212 and openings 210 in bracket 206 so that as the upper end of part 212 is moved a certain distance by the cam 108 it may move carrier 212 a predetermined distance according to the location of the pivotal connections between the actuator and bracket.

A collar 220 fixed to tool carrier 204 has spaced ears 222 in which is oscillatable a stud 224 while a stud 226 is oscillatable in actuator 212.

A rod 228 has a threaded end in engagement with the stud 224 and tubes 230 and 232 are disposed between the studs 226 and 224 and between the stud 226 and a manually engageable part 234 of rod 228. As in the former case the relationship of the actuator and tool carrier may be varied by rotating the rod 228 in one direction or the other and the carrier may be caused to travel back and forth through various distances by changing the location of the pivot 216.

From the foregoing it will be observed that the tool carriers may be moved back and forth through any desired distance merely by changing the pivotal connections for the actuator thus not only eliminating the necessity for changing the cams which operate the actuators but the cams may be in engagement throughout their cycle of operation with the parts acted on thereby thus making it possible to operate at high speed and produce objects of the desired accuracy and uniformity.

While I have described the invention in great detail and with respect to a preferred form thereof, it is not desired to be limited thereto since many changes and modifications may be made therein without departing from the spirit and scope of the invention. What it is desired to claim and secure by Letters Patent of the United States is:

1. A machine of the class described comprising in combination, a support, a cam member rotatable therein having cam surfaces, a pair of tool carriers mounted on the axis of the cam member for swinging movements, a pair of actuators having a series of openings therein, spaced plates on the support disposed above and below said actuators having openings therethrough, a pivot pin for each actuator in a certain opening thereof and of the plates above and below the lever, connections between said actuators and tool carriers, and means on said actuators engageable by said cam surfaces.

2. A machine of the class described comprising in combination, a support having spaced upper and lower plates at opposite sides thereof, a cam member rotatable on a horizontal axis and having cam surfaces, tool carriers swingable on the axis of the cam member, actuators at opposite sides of the supports between said plates having inwardly extending parts at one end thereof engaging the cam surfaces, each actuator and the plates above and below the same provided with a row of registerable pivot openings, pivots in the openings of each actuator and the plates above and below the same, and connections between the other ends of the actuators and tool carriers, all adapted whereby the inner ends of the actuators are moved through a certain distance by the cam surfaces while the forward ends may be moved through various distances by varying the location of the pivots and arranged whereby the said actuators swing in planes parallel to the axis of rotation of the cam member.

3. A machine of the class described comprising in combination, a support having spaced pairs of upper and lower plates at either side thereof horizontally disposed, and spaced plates therebelow vertically disposed, a cam member rotatable on a horizontal axis above and between the pairs of plates, a tool holder reciprocable on a horizontal axis, a work holder rotatable on alignment therewith, tool carriers swingable on the axis of the cam member having parts to carry tools for engaging work in the work holder, an actuator swingable between each pair of plates in horizontal planes having inwardly extending parts engageable by said cam member, an actuator between the vertically disposed plates swingable in a vertical plane having a part engageable by said cam member, the said first-named actuators and plates above and below the same having a plurality of registrable openings, the second-named actuator and plates at opposite sides thereof having registrable openings, pivot pins for each actuator and the openings of the plates adjacent thereto, and connections between the first-named actuators and tool carriers and between the last-named actuator and tool carrier, all adapted and arranged whereby the parts of the actuators engaged by the cam are moved a certain distance while carriers engaging parts may be moved variable distances according to the position of the pivots relative to its respective axis to move the tool carriers various distances.

4. A machine of the class described comprising in combination, a support having spaced pairs of upper and lower plates at either side thereof horizontally disposed, and spaced plates therebelow vertically disposed, a cam member rotatable on a horizontal axis above and between the pairs of plates, a tool holder reciprocable on a horizontal axis, a work holder rotatable in alignment therewith, tool carriers swingable on the axis of the cam member having parts to carry tools for engaging work in the work holder, an actuator swingable between each pair of plates in horizontal planes having inwardly extending parts engageable by said cam member, an actuator between the vertically disposed plates swingable in a vertical plane having a part engageable by said cam member, the said first-named actuators and plates above and below the same having a plurality of registrable openings, the second-named actuator and plates at opposite sides thereof having registrable openings, pivot pins for each actuator and the openings of the plates adjacent thereto, and connections between the first-named actuators and tool carriers and between the last-named actuator and tool carrier, all adapted and arranged whereby the parts of the actuators engaged by the cam are moved a certain distance while carrier engaging parts may be moved variable distances according to the position of the pivots relative to its respective axis to move the tool carriers various distances the said connections including rotatable members in an actuator and in a tool carrier and a rod extending through one rotatable member and threadedly engaging the other with a spacer between the rotatable members.

5. In a machine tool of the class described comprising in combination, a metal tube for rotatably supporting a bar of work, and a covering of yieldable material such as rubber or the like to deaden vibrations and noise as a bar of work rotates in the metal tube.

6. A machine of the class described comprising in combination, a support, a cam member rotatable therein having separate cam surfaces, a pair of tool carriers mounted for swinging movements towards and away from one another, parts on the support in spaced relation having spaced pivot openings therein, a pair of actuators having pivot openings therein registerable with the openings of the said parts, a pivot pin for each actuator in a certain opening thereof and of said parts, rear portions of the actuator in engagement with said cam surfaces, connections between forward portions of said actuators and tool carriers, all adapted and arranged whereby the rear ends of the actuators are moved constant distances by the cam surfaces and the forward ends of the actuators may be moved different distances by disposing the pivots in different openings in the actuators and parts.

7. In a machine tool of the class described comprising in combination, a metal feed tube for rotatably supporting a bar of work, and a covering tube of yieldable material such as rubber or the like around the feed tube, the said covering tube tightly embracing the feed tube to provide a wall consisting of the wall of the feed tube and the wall of the covering tube in intimate contact with one another substantially throughout their areas whereby the covering tube is adapted to deaden noise in the feed tube created by a rotating bar of work.

8. A machine of the class described comprising in combination, a support, a cam member rotatable therein having cam surfaces, a pair of tool carriers mounted on the axis of the cam member for swinging movements, a pair of actuators having a series of openings therein, spaced plates on the support disposed above and below said actuators having openings therethrough, a pivot pin for each actuator in a certain opening thereof and of the plates above and below the lever, connections between said actuators and tool carriers, and means on said actuators engageable by said cam surfaces, the said connections between the actuators and tool carriers including hollow members between the same and members extending therethrough threaded in the tool carriers.

9. A machine of the class described comprising in combination, a support having actuator plates, a common cam member having a plurality of cam surfaces, a plurality of tool carriers, a plurality of actuators, having parts engageable by the cam surfaces, each plate and the actuator adjacent thereto provided with a row of pivot holes, a pivot for a hole of each plate and adjacent actuator, connections between the actuators and tool carriers, all adapted and arranged whereby the parts of the actuators engaging the cam surfaces are moved through a constant distance while the parts of the actuators connected to the tool carriers may be moved through different distances according to the pivot holes of the plates and actuators selected.

10. A machine of the class described comprising in combination, a support, a cam member rotatable therein having separate cam surfaces, a pair of tool carriers mounted for swinging movements towards and away from one another, parts on the support in spaced relation having spaced pivot openings therein, a pair of actuators having pivot openings therein registerable with the openings of the said parts, a pivot pin for each actuator in a certain opening thereof and of said parts, certain portions of the actuators in engagement with said cam surfaces, connections between other portions of said actuators and tool carriers, all adapted and arranged whereby certain portions of the actuators are moved constant distances by the cam surfaces and the other portions of the actuators may be moved different distances by disposing the pivots in different openings in the actuators and parts.

11. A machine of the class described comprising in combination, a rotatable cam having separate cam surfaces for separate actuators, a pair of tool carriers arranged for movement towards and away from one another in a certain plane, a tool carrier arranged for movement in a different plane, parts on the support for actuators each provided with a row of pivot openings, actuators one for each tool carrier having pivot openings registerable with the openings in said parts, a pivot pin for each actuator in a certain opening thereof and of said parts, certain portions of each actuator in engagement with a certain separate cam surface, and connections between other portions of the actuators and tool carriers, all adapted and arranged whereby certain portions of the actuators are moved constant distances by the cam surfaces and the other portions of the actuators may be moved different distances by disposing the pivots in different openings of the actuators and parts.

GUY C. WORRELL.